(12) United States Patent
Hoffmann

(10) Patent No.: US 6,652,209 B2
(45) Date of Patent: Nov. 25, 2003

(54) CONNECTION ELEMENT

(75) Inventor: Armin Hoffmann, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/981,521

(22) Filed: Oct. 17, 2001

(65) Prior Publication Data

US 2002/0048499 A1 Apr. 25, 2002

(30) Foreign Application Priority Data

Oct. 23, 2000 (DE) .......................................... 100 52 448

(51) Int. Cl.[7] ................................................. F16B 37/08
(52) U.S. Cl. ........................ 411/438; 411/265; 411/289; 411/432
(58) Field of Search ................................ 411/432, 433, 411/438, 277, 278, 279, 265, 270, 289; 74/441; 285/314

(56) References Cited

U.S. PATENT DOCUMENTS 534,829 A * 2/1895 Heyer
1,103,847 A * 7/1914 Schneider
3,653,691 A * 4/1972 Bram
6,461,091 B2 * 10/2002 Herb

FOREIGN PATENT DOCUMENTS

JP 20762 * 6/1971

* cited by examiner

Primary Examiner—Flemming Saether
(74) Attorney, Agent, or Firm—Sidley Austin Brown & Wood, LLP

(57) ABSTRACT

A connection element for a bolt (2, 26) including a member (1, 27) for receiving the bolt (2, 26) and having a bore (4) through which the bolt (2, 26) extends, a spring (3) located in the bore (4) of the receiving member (1) for locking the bolt (2, 26) therein, and two, displaceable relative to each other, coaxial with each other and with the spring (3), cone sleeves (9, 10) located in the bore (4) of the receiving member (1) and having each a through-bore (11) which expands conically at its end adjacent to the spring (3) and has a largest inner diameter, which is larger than an outer diameter of the spring (3), and a smallest diameter which is smaller than the outer diameter of the spring (3) but is at least equal to a diameter of the bolt.

10 Claims, 4 Drawing Sheets

CONNECTION ELEMENT

BACKGROUND OF THE INVENTION

1. Field of the Invention

The present invention relates to a connection element for a bolt and including a member for receiving the bolt and having a bore through which the bolt extends, and a spring located in the bore and formlockingly cooperating with the outer profile of the bolt for locking the same.

2. Description of the Prior Art

The connection elements of the type described above are designed for fixedly retaining a bolt in place. A known connection element includes a receiving member with thread elements extending radially to a bolt and biased in a setting direction. Upon insertion of the bolt, the thread elements spring substantially radially outwardly, engaging in the following outer profile of the bolt. With a load acting in a direction opposite to the setting direction, the thread elements are completely pressed into the outer profile of the bolt, fixing the bolt in place.

The advantage of the above-described connection element consists in that it can be simply and economically produced. Another advantage of the above-described connection element consists in that it can be easily handled. The drawback of this solution consists in that the bolt can be loaded only in a direction opposite the setting direction. This significantly limits the use of the above-described connection element.

Another connection element is disclosed in German Publication DE-A1-198 31 001. The disclosed connection element includes a spring acting as a locking member and which formlockingly cooperates with the bolt outer profile.

The advantage of the connection element consists in that the connection element can be easily pushed over the bolt. When the connection element is pushed over the bolt, the spring expands and slides over the bolt, in particular, over the bolt outer profile. This eliminates a screw movement. Again, the drawback of the disclosed connection element consists in that the load can be applied only in one direction. The disclosed connection element does not insure a reliable connection when dynamic loads are applied to the bolt.

Accordingly, an object of the present invention is to provide a connection element for a bolt with an outer profile which can be easily and rapidly mounted.

Another object of the present invention is to provide a connection element of the above-described type which would insure a reliable connection and which is capable of withstanding loads acting in opposite axial directions with respect to the bolt axis.

SUMMARY OF THE INVENTION

These and other objects of the present invention, which will become apparent hereinafter, are achieved by providing two, displaceable relative to each other, coaxial with each other and with the spring, cone sleeves located in the bore of the receiving member and encompassing the spring, and having each a through-bore which expands conically, at least at its end adjacent to the spring, and which has a largest inner diameter, which is larger than an outer diameter of the spring, and a smallest diameter which is smaller than the outer diameter of the spring but which is at least equal to an outer diameter of the bolt.

The arrangement of the spring between two, displaceable relative to each other, cone sleeve insures that the bolt can be fixed by displacement of one of both sleeves. The at least partially conical through-bore, which is provided at an end of the cone sleeve adjacent to a spring end, insures that upon tightening of the sleeves relative to each other in the axial direction, a pressure, which is applied to the spring as a result of relative tightening of the sleeves, causes displacement of the spring turns into the outer profile of the bolt, resulting in a formlocking connection of the spring with the bolt. Matching of the outer diameter of the spring with the dimensions of the sleeve through-bore insures that the spring, on one hand, is at least partially received in the through-bores of both sleeves at least during axial tightening of the sleeves and, on the other hand, the spring would not be completely received in the through-bores. With the cone sleeves not being tightened relative to each other, the bolt can be easily inserted into the connection element and displaced there as needed. When the bolt is being inserted, the spring expands radially and slides over the outer profile of the bolt.

Advantageously, the spring is formed as a cylindrical, one-piece wire spring having two wire ends and a plurality of turns. Thus, there is provided a spring that can be economically produced using conventional means. The cylindrical shape of the spring insures compactness of the connection element.

Essential is that both spring ends can be partially received in the respective through-bores of respective cone sleeves, whereby fixing of the bolt is insured. Instead of wire, another material, e.g., plastics, can be used.

Advantageously, each of the cone sleeves has a longitudinal slot opening toward a spring end and a longitudinal wall of which forms a stop for the spring end.

The stop limits the rotation of the spring relative to the cone sleeves. According to an advantageous embodiment of the present invention, the cone sleeves have a longitudinal slot having a width corresponding to 0.25÷0.2 of the thickness of the sleeve wall.

Advantageously, the receiving member is formed of two, axially displaceable relative to each other elements. The two cone sleeves are connected with the two elements forming the receiving member for joint displacement therewith. Thereby, the sleeves can be displaced relative to each other by the receiving member-forming elements which can be connected with each other by thread means. The two elements form stops for respective sleeves. And the sleeves can be displaced relative to each other by rotation of the two receiving member-forming elements relative to each other in opposite directions. The two, receiving member-forming elements insure a controlled displacement of the two cone sleeves.

In order to provide for adjustment of a radial width of the spring, one of the cone sleeve has an engagement portion that projects beyond the receiving member, and the other cone sleeve is connected with the receiving member without a possibility of rotation relative thereto.

The radial width of the spring is adjusted by rotation of the cone sleeve with the engagement portion relative to the receiving member. Because the other, opposite sleeve is connected with the receiving member without a possibility of rotation relative thereto and both spring ends engage the stop surfaces of the opposite sleeves, the rotation of one of the sleeve relative to another sleeve provides for a change of the spring width. The radial width of the spring determines the strength of the connection between the bolt and the connection element. Thus, by controlling the width of the spring, the strength of the connection of the bolt with the connection element can be controlled.

Advantageously, the receiving member has a bore section the diameter of which corresponds to the outer diameter of the bolt and which provides for an alignment of the bolt with the axis of the connection member. This insures proper fixation of the bolt in any arbitrary axial position of the bolt.

Advantageously, the longitudinal slot has a substantially V-shape which widens in the spring direction. This facilitates the insertion of the spring end in the through-bore of a respective cone sleeve.

To insure a high elasticity and a load-carrying capability, advantageously, both cone sleeves and the spring are formed of spring steel, in particular of a hardened spring steel.

According to a further advantageous embodiment of the present invention, the inner diameter of the spring at least corresponds to the outer diameter of the bolt. When the inner diameter of the spring corresponds to the outer diameter of the bolt, the pitch of the spring turns needs not correspond to the pitch of the outer thread of the bolt. This permits to use bolts with an arbitrary outer profile. The connection of the bolt with the connection element is insured, in this case, by tightening the cone sleeves relative to each other.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
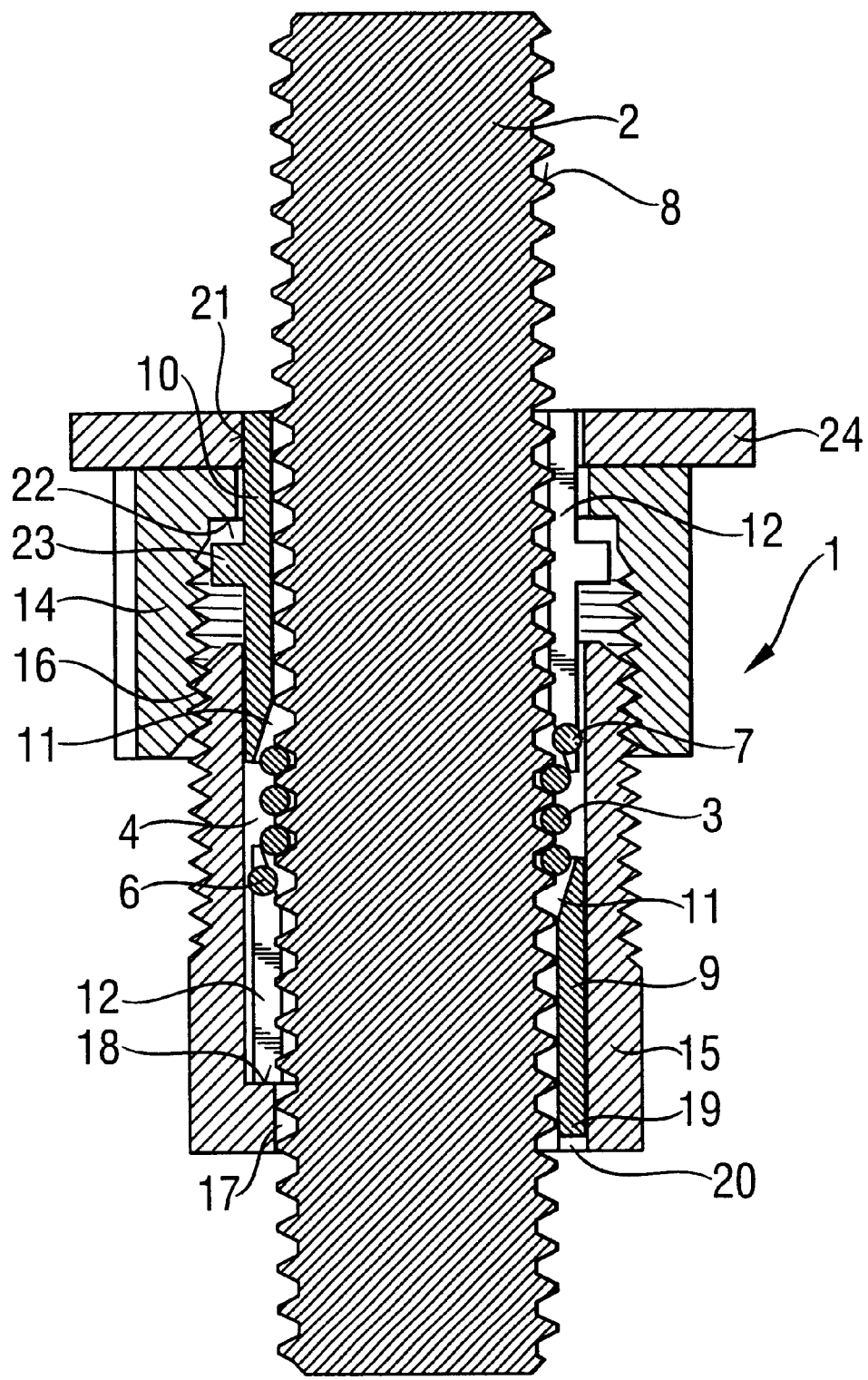
FIG. 1 a cross-sectional axial view of a connection element according to the present invention.
Figure 2:
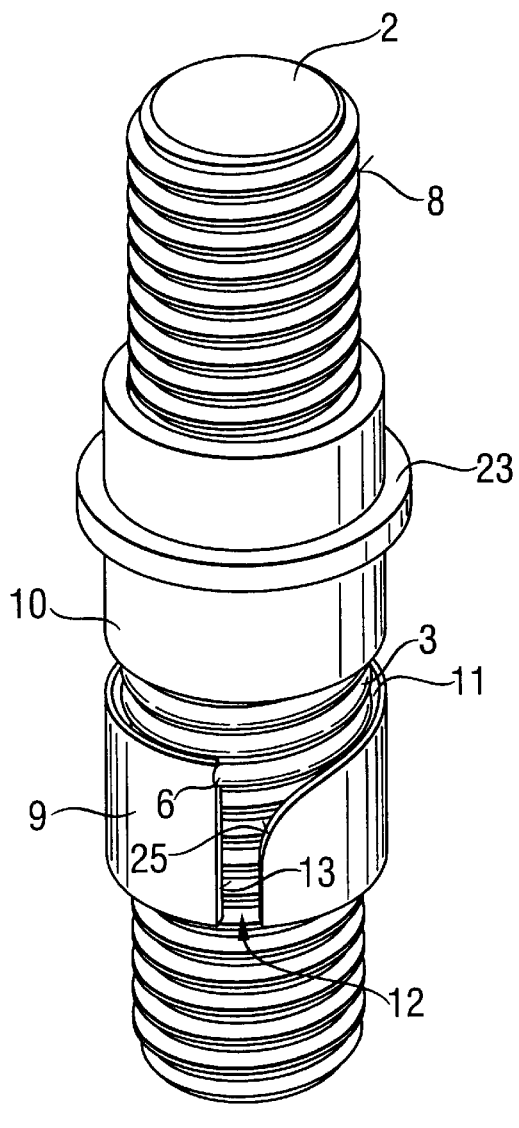
FIG. 2 a side perspective view of a connection element according to the present invention without a receiving member.
Figure 3:
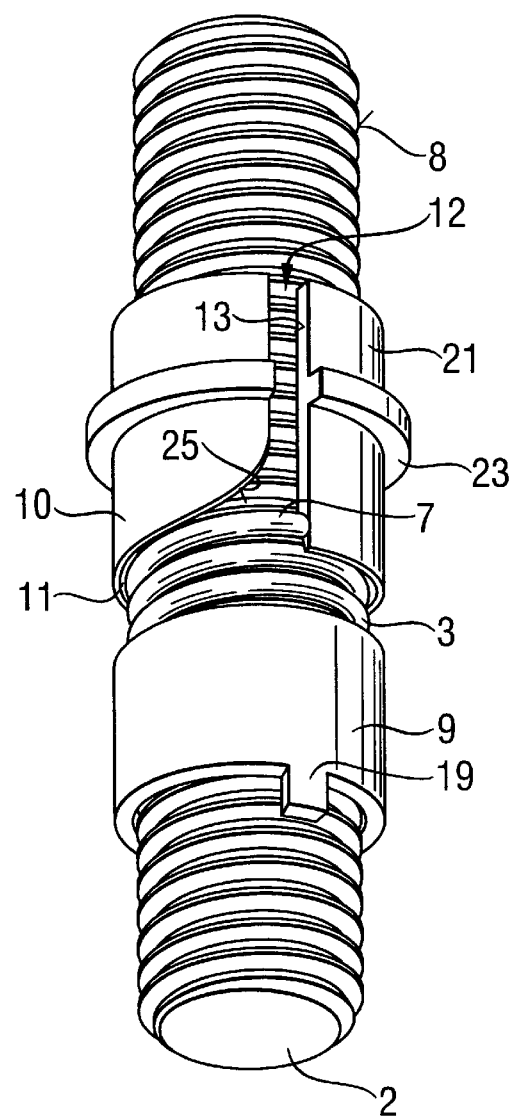
FIG. 3 a view similar to that of FIG. 2 but with the connection element being pivoted by 180° about its longitudinal axis.

A connection element according to the present invention for receiving a bolt 2 and which is shown in FIGS. 1–3, includes a receiving member 1 for the bolt 2 and spring 3 that serves as a locking member. The receiving member 1 has a bore 4 for receiving the spring 3.

The locking spring 3 is formed as a cylindrical wire spring with two ends 6 and 7 and which formlockingly cooperates with an outer profile, in particular, with an outer thread 8 of the bolt 2, as it can be clearly seen in FIGS. 2 and 3. About two or three turns of the spring 3 formlockingly engage in the outer thread 8 of the bolt 2. The pitch of the turns of the spring 3 somewhat corresponds to the pitch of the outer thread 8 of the bolt 2, and the outer diameter of the spring 3 somewhat corresponds to the outer diameter of the thread 8. Both ends 6 and 7 of the spring 3 are so bent that they extend radially relative to the thread 8 of the bolt 2 by about one fourth of the winding circumference.

In the region of each wire end 6, 7, there is provided a cone sleeve 9, 10 having an at least partially conical through-bore 11. The diameter of the through-bore 11 is somewhat greater than that of the spring 3. The angle of the conical part of the through-bore 11 amounts to about 15–20° and corresponds somewhat to the pitch of the outer thread 8 of the bolt 2. The largest inner diameter of the through-bore 11 corresponds to at least the outer diameter of the spring 3 as it is at least partially received in the through-bore 11. The smallest inner diameter of the through-bore 11 corresponds at least to the outer diameter of the bolt 2 and is smaller than the outer diameter of the spring 3. Both cone sleeves 9, 10 have an elongate slot 12 into which a respective end of the spring 3 is inserted. An elongate wall of the slot 12, which faces the respective end 6, 7 of the spring 3, serves as a stop therefor. A wall of the elongate slot 12 opposite the stop wall has a rounded corner 25.

The receiving member 1 has a receiving through-bore 17 extending coaxially with the bore 4 and the diameter of which somewhat corresponds to the outer diameter of the bolt 2. The receiving member 1 is formed of a nut element 14 and a threaded element 15. The nut element 14 has an inner thread 16 with which the nut element 14 is screwed on the threaded element 15. The inner thread 16 of the nut element 14 provides for axial displacement of the nut element 15 relative to the bolt 2. The cone sleeve 9 engages a stop surface 18 provided at the end of the through-bore 17. At its end adjacent to the stop surface 18, the cone sleeve 9 has a web 19 which engages in a complementary recess 20 formed in the threaded element 15 in the region of the stop surface 18. The web 19 and the recess 20 prevent rotation of the cone sleeve 9 relative to the threaded element 15. The other sleeve 10 has an engagement portion 21 that projects beyond the nut element 14 and has a web 23 extending at least partially over the circumference of the cone sleeve 10 approximately in the middle thereof. The web 23 cooperates with a mating shoulder 22 provided on the nut element 14 and serving as a stop.

When a user rotates the cone sleeve 10 by rotating a disc 24 which is secured on the engagement portion 21 for joint rotation with the cone sleeve 10, rightwards, the spring 3 expands freeing the respective turns of the outer thread 8 of the bolt 2. In its expanded position, the spring 3 engages the wall of the bore 4, and the bolt 2 becomes freely displaceable.

Upon release of the disc 24, the spring 3 becomes compressed and fixes the bolt 2 in a desired location. The number of turns of the spring 3 is so selected that the wire ends 6 and 7 are radially offset by about 180°. This insures that the spring 3 is centered in the bore 4 of the threaded element 15 in its non-loaded condition. Both cone sleeves 9 and 10 have one edge of their respective elongate slots 12 rounded, with formation of the rounded corner 25, so that exposed portions of the respective wire ends lie free. When with a preliminary fixed bolt 2, the nut element 14 is screwed down over the thread 16 of the threaded element 15, both cone sleeves 9 and 10 are pushed over the spring 3. The cone sleeve 10 is pushed over the spring 3 as a result of cooperation of the shoulder 22 of the nut element 14 and the web 23 of the cone sleeve 10, and the sleeve 9 is pushed over the spring 3 as a result of tightening of the nut element 14. As both cone sleeves 9, 10 and the spring 3 are formed of a hardened spring steel, the spring 3 is pressed into the outer thread 8 of the bolt 2 by a complete turns pitch at both conical through-bores 11. With a very flat angle of the conical through-bore 11, upon application of a pulling force to the bolt 2, as when a pressure load is applied, an additional secondary expansion effect is produced on the bolt which further increases the applied locking load.

Figure 4:
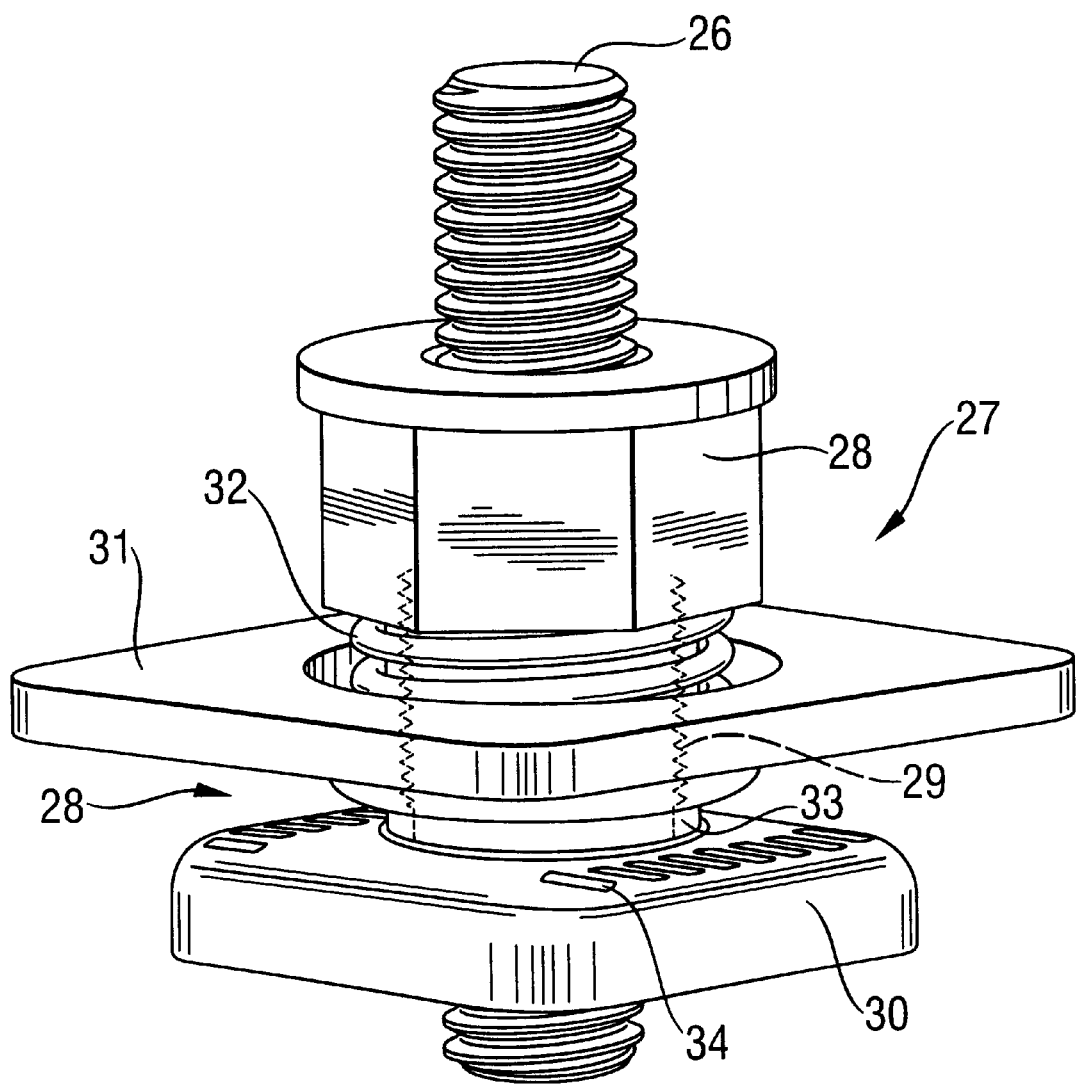
FIG. 4 a perspective view of a connection element according to the present invention formed as a track nut.

FIG. 4 shows an embodiment of a connection element according to the present invention which is formed as a track nut. The connection element includes a receiving member 27 in which a bolt 26 is received. The receiving member 27 includes a nut element 28 and a threaded element 29 screwed with each other. At its end remote from the nut element 28, the threaded element 29 has an engagement member 30. A hold-up member 31 is provided between the nut element 28 and the engagement member 31. The hold-up member 31 is axially displaceable relative to the bolt 26. The hold-up member 31 has a conical bore that expands in a direction of the nut element 28 and serves for receiving a tension spring 32. Adjacent to the hold-up member, coaxial with the through-bore of the hold-up member 31, a spacing sleeve 33 is provided. The spacing sleeve 33 insures a minimum spacing between the engagement member 30 and the hold-up member 31.

The engagement member 30 has, at its side adjacent to the hold-up member 31 in the regions of its opposite edge, stamped-out teeth 34. The teeth 34 are engageable with mating teeth formed in a rail (not shown), e.g., a C-shaped rail. The tension spring 32 has a small projection which insures that the engagement member 31 is locked in the rail. Upon screwing the nut element down, the tension spring becomes compressed and clamps the hold-up member 31 to the rail. As a result, with a single operational step, the bolt 26 is fixed to the rail in all of the loading directions.

Figure 5:
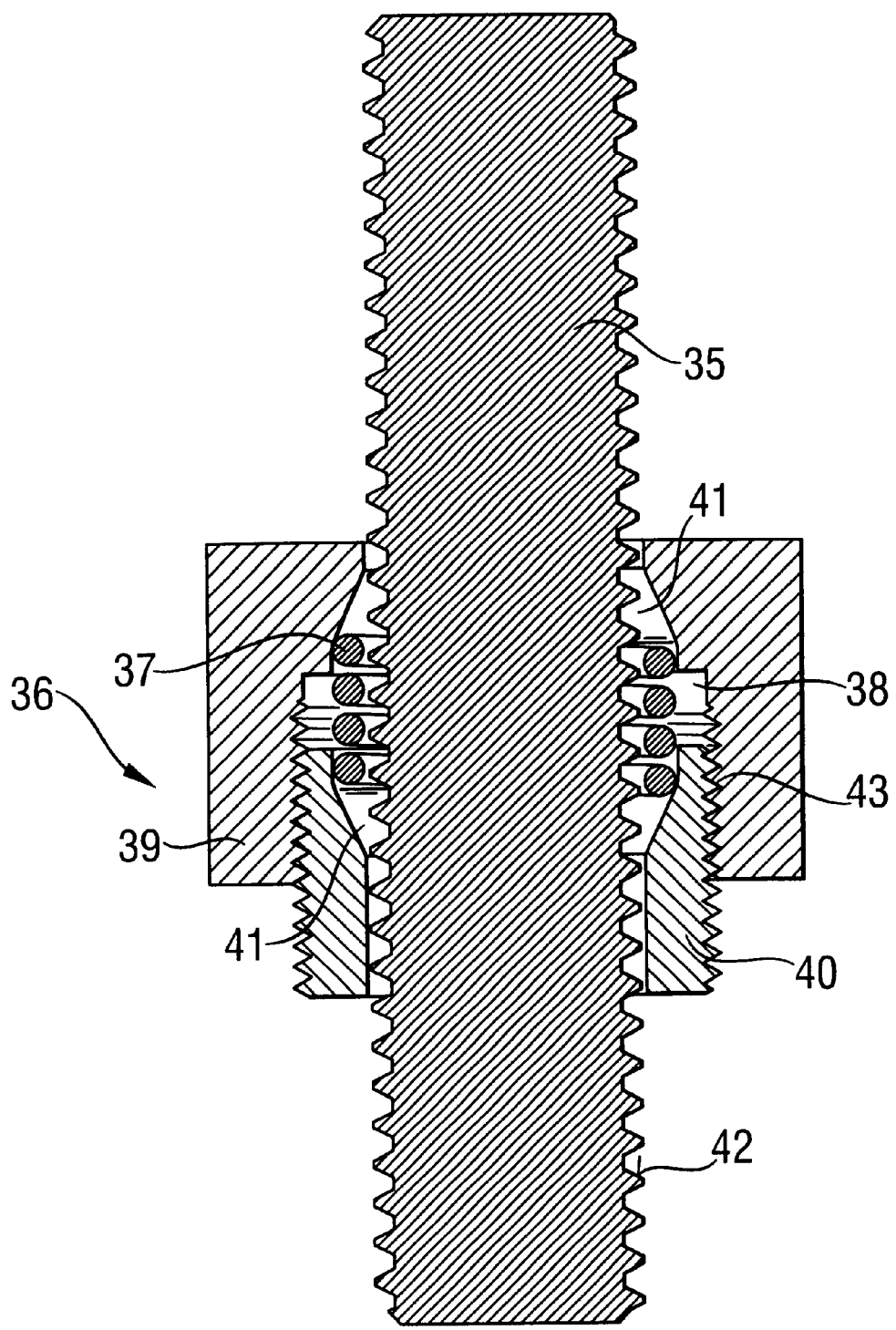
FIG. 5 a cross sectional axial view of another embodiment of a connection element according to the present invention.

Another embodiment of a connection element according to the present invention is shown in FIG. 5. The connection element includes a receiving member 36 for receiving the bolt 35 and a spring 37 forming the locking element. The receiving member 37 has a bore 38 in which the spring 37 is received. A cone sleeve 39, 40 is provided in each of the wire ends of the spring 37. Each of the cone sleeves 39, 40 has at least a partially conical bore 41, with the inner diameter of the bore 41 increasing relative to the spring 3. Contrary to the embodiments described earlier, the spring 37 does not engage in an outer thread 42 provided on the bolt 26 in the rest position. The two cone sleeves 39, 40 are rotatable connected with each other by a threaded connection 43. When the cone sleeves 39, 40 are screwed relative to each other so that they move relative to each other, the spring 47 is pressed into the outer thread 42 of the bolt 35 in the regions of respective conical bores. In this way, a formlocking or at least forcelocking, releasable connection is formed between the bolt 35 and the receiving member 36.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A connection element for a bolt (2,26,35) having an outer thread with a predetermined pitch, the connection element comprising two coaxial elements displaceable axially relative to each other and having each a bore through which the bolt is extendable; and a cylindrical, one-piece wire spring received in the bore of at least one of the two elements for locking the bolt therein, the wire spring having a plurality of turns having a pitch substantially corresponding to the pitch of the outer thread of the bolt and engageable in grooves between turns of the outer thread of the bolt, locking same, upon displacement of the two elements toward each other.

2. A connection element for a bolt, comprising a member (1,27) for receiving the bolt and having a bore (4) through which the bolt (2,26) is extendable; a spring (3) located in the bore (4) for engaging an outer profile of the bolt (2,26) for locking the bolt (2,26) in the receiving member (1); and two coaxial cone sleeves (9,10) located in the bore (4) and displaceable relative to each other, the two cone sleeves (9,10) being arranged coaxially with the spring (3) encompassing the spring (3) from opposite axial ends (6,7) of the spring, and each having a through-bore (11) expanding conically at least at an end thereof adjacent to the spring (3), and each through-bore (11) having a largest inner diameter, which is larger than an outer diameter of the spring (3), and a smallest inner diameter which is smaller than the outer diameter of the spring (3) but which is at least equal to an outer diameter of the bolt (2,26), wherein the spring is formed as a cylindrical, one-piece wire spring having a plurality of turns.

3. A connection element according to claim 2, wherein each of the cone sleeves (9,10) has a longitudinal slot opening toward a respective axial end of the spring (3) and a longitudinal wall of which forms a stop for the respective spring end.

4. A connection element according to claim 3, wherein the longitudinal slot has a substantially V-shape widening in a direction of the spring (3).

5. A connection element according to claim 2, wherein the receiving member is formed of two elements (14, 15) axially displaceable relative to each other.

6. A connection element according to claim 5, wherein the two elements (14,15) of the receiving member (1,27) are connected with respective cone sleeves (9,10).

7. A connection element for a bolt, comprising a member (1,27) for receiving the bolt and having a bore (4) through which the bolt (2,26) is extendable; a spring (3) located in the bore (4) for engaging an outer profile of the bolt (2,26) for locking the bolt (2,26) in the receiving member (1); and two coaxial cone sleeves (9,10) located in the bore (4) and displaceable relative to each other, the two cone sleeves (9,10) being arranged coaxially with the spring (3) encompassing the spring (3) from opposite axial ends (6,7) of the spring, and each having a through-bore (11) expanding conically at least at an end thereof adjacent to the spring (3), and each through-bore (11) having a largest inner diameter, which is larger than an outer diameter of the spring (3), and a smallest inner diameter which is smaller than the outer diameter of the spring (3) but which is at least equal to an outer diameter of the bolt (2,26)

wherein each of the cone sleeves (9, 10) has a longitudinal slot (12).

8. A connection element for a bolt, comprising a member (1,27) for receiving the bolt and having a bore (4) through which the bolt (2,26) is extendable; a spring (3) located in the bore (4) for engaging an outer profile of the bolt (2,26) for locking the bolt (2,26) in the receiving member (1); and two coaxial cone sleeves (9,10) located in the bore (4) and displaceable relative to each other, the two cone sleeves (9,10) being arranged coaxially with the spring (3) encompassing the spring (3) from opposite axial ends (6,7) of the spring, and each having a through-bore (11) expanding conically at least at an end thereof adjacent to the spring (3), and each through-bore (11) having a largest inner diameter, which is larger than an outer diameter of the spring (3), and a smallest inner diameter which is smaller than the outer diameter of the spring (3) but which is at least equal to an outer diameter of the bolt (2,26), wherein the receiving member is formed of two elements (14, 15) axially displaceable relative to each other, wherein the two elements (14, 15) of the receiving member (1, 27) are connected with respective cone sleeves (9, 10), and wherein one of the cone sleeves (10) has an engagement portion (21) that projects beyond the receiving member (21), and wherein the other cone sleeve (9) is connected with the receiving member (21) without a possibility of rotation relative thereto.

9. A connection element for a bolt, comprising a member (1,27) for receiving the bolt and having a bore (4) through which the bolt (2,26) is extendable; a spring (3) located in the bore (4) for engaging an outer profile of the bolt (2,26) for locking the bolt (2,26) in the receiving member (1); and two coaxial cone sleeves (9,10) located in the bore (4) and displaceable relative to each other, the two cone sleeves (9,10) being arranged coaxially with the spring (3) encompassing the spring (3) from opposite axial ends (6,7) of the spring, and each having a through-bore (11) expanding conically at least at an end thereof adjacent to the spring (3), and each through-bore (11) having a largest inner diameter, which is larger than an outer diameter of the spring (3), and a smallest inner diameter which is smaller than the outer diameter of the spring (3) but which is at least equal to an outer diameter of the bolt (2,26), wherein both cone sleeves (9, 10) and the spring (3) are formed of spring steel.

10. A connection element according to claim 9, wherein the cone sleeves (9,10) and the spring (3) are formed of a hardened spring steel.

\* \* \* \* \*